No. 886,417. PATENTED MAY 5, 1908.
G. SCHMIDT & J. F. PFLUM.
HOG HOIST.
APPLICATION FILED JULY 23, 1906.
2 SHEETS—SHEET 1.
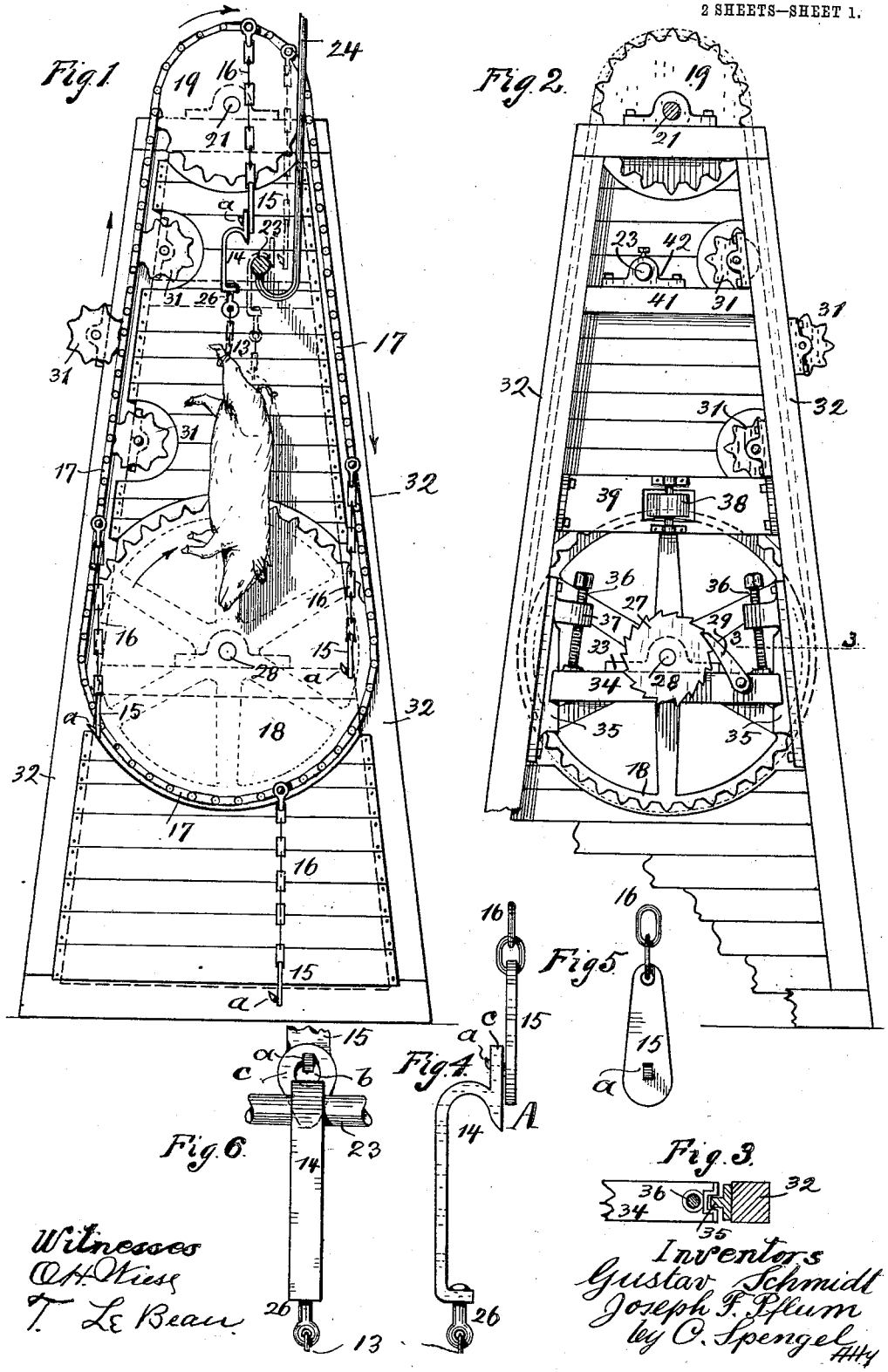

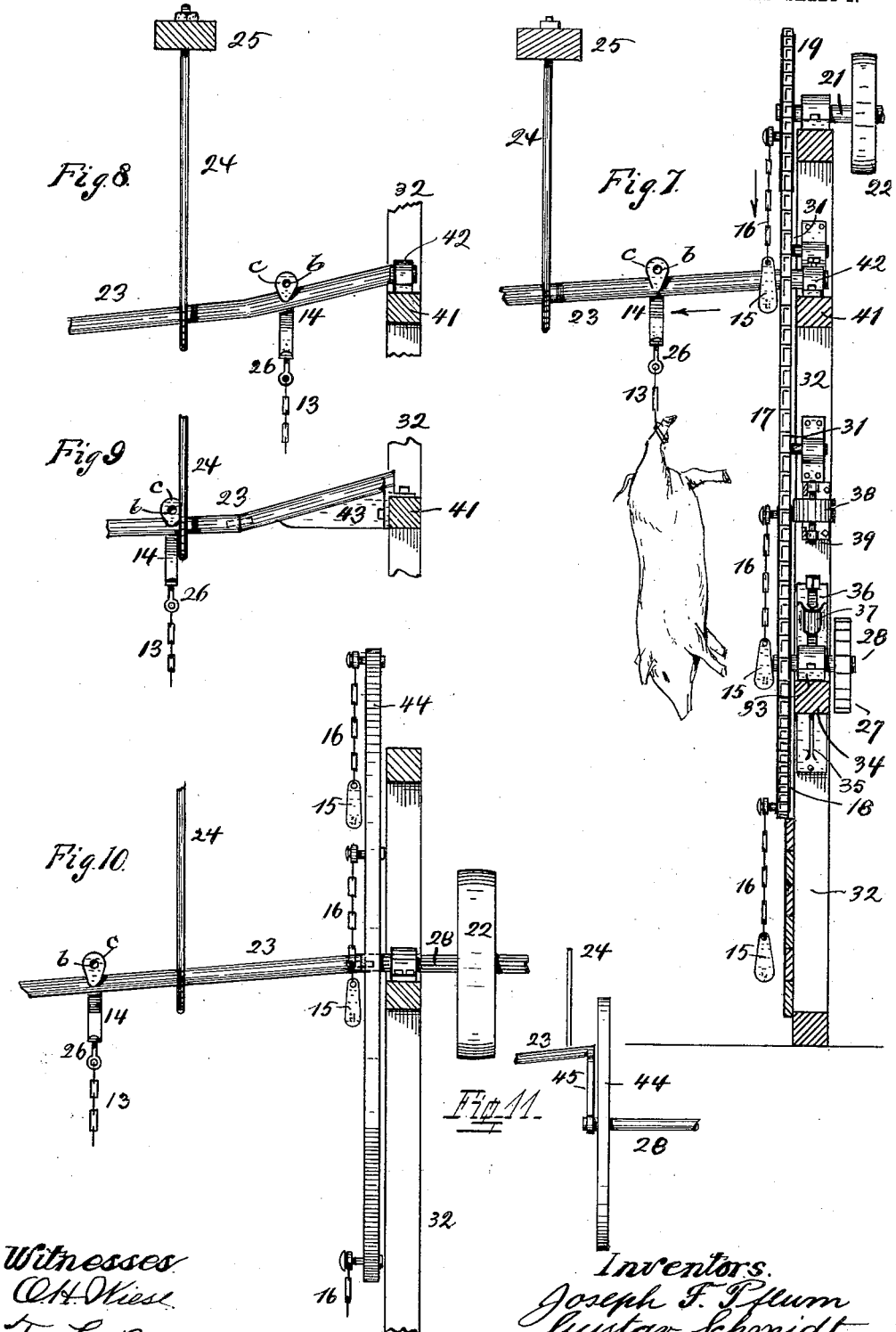

UNITED STATES PATENT OFFICE.

GUSTAV SCHMIDT AND JOSEPH F. PFLUM, OF CINCINNATI, OHIO, ASSIGNORS TO THE CINCINNATI BUTCHER'S SUPPLY COMPANY, OF CINCINNATI, OHIO, A CORPORATION OF OHIO.

HOG-HOIST.

No. 886,417.      Specification of Letters Patent.      Patented May 5, 1908.

Application filed July 23, 1906. Serial No. 327,269.

*To all whom it may concern:*

Be it known that we, GUSTAV SCHMIDT and JOSEPH F. PFLUM, citizens of the United States, and residing at Cincinnati, Hamilton county, State of Ohio, have invented certain new and useful Improvements in so-called Hog-Hoists; and we do declare the following to be a full, clear, and exact description of our invention, attention being called to the accompanying two sheets of drawings, with the reference characters marked thereon, which form also a part of this specification.

This invention relates to certain new and useful improvements in so-called hog-hoists which are devices whereby in slaughterhouses live hogs are handled for the purpose of placing them in proper position for killing and bleeding.

The particular features of this invention will be more fully described in the following specification and pointed out in the claims at the end thereof.

The construction is illustrated in the accompanying two sheets of drawings in which: Figure 1, is a front-view of the hog-hoist. Fig. 2, is a rear-view of the same. Fig. 3, is a sectional detail-view taken on line 3—3, of Fig. 2. Fig. 4, shows the complementary members of a coupling whereby the shackled hog is hung to the hoist. Fig. 5, shows another view of one of the members of this coupling, it being the upper one. Fig. 6, shows the lower member and lower part of the upper one. Fig. 7, is a vertical central section through the frame of the apparatus as it appears in Figs. 1 and 2. Fig. 8, is a view similar to the upper part of Fig. 7, the construction being modified. Figs. 9 and 10, in similar views show each additional modified constructions of the same parts. Fig. 11, at reduced scale shows a further modified construction of the parts.

These hoists are usually erected in an inclosure or pen into which the hogs to be killed are driven. They are grabbed one at a time and one end of a shackle (chain) 13, is quickly attached to one of the hind legs of the selected animal. At the other end of this shackle there is one of the complementary members of a coupling A, (see Fig. 4.) which member we call hereafter the rail-hook and designate it with 14, as shown in Figs. 4, and 6. Shackle-chain 13, connects to the lower end of the straight part of the rail-hook. The shackled animal is now by means of this member 14, attached to the other complementary member of coupling A, which member we call lifter-hook and designate it with 15, as shown in Figs. 4 and 5.

The straight part of the lifter-hook is at the lower end of a lifter-chain 16, of which there are a number, and the upper ends of each of which chains are permanently attached to a hoisting-chain 17, which is stretched between two sprocket-wheels 18, and 19, both in one plane and with their centers vertically alined.

Fig. 7 illustrates manner of connection of lifter-chains 16, to hoisting-chain 17.

The upper wheel is of smaller diameter and the shafts of both of them are supported on the general frame of the apparatus (see Figs. 2, and 7.) Power may be applied to either one of these shafts, the upper one 21, preferred, a pulley 22, or equivalent driving element being shown in Fig. 7. When the killing-department of the slaughter-house plant is in operation, this endless chain 17, is constantly in motion, carrying the lifter-chains around with it from their lowest position in the pen, up over the sticking-rail 23, so-called because the hog is stuck and killed while hanging on it, and back down again. Whenever one of these lifter-chains arrives with its lower end within convenient reach of the man in the pen, he, being ready with a shackled hog, connects the two complementary members 14, and 15, of the coupling A, hooking-member 14, onto member 15, after which the uninterruptedly moving apparatus hoists at once the hog out of the pen and carries it up to the sticking-rail.

The parts are so designed and arranged that when the particular lifter-chain has arrived in its highest position and is ready to descend, coupling A, and particularly the straight part of lower member 14, of the same, encounters sticking-rail 23, which is angularly arranged to the path in which the chain moves and fixedly supported by means of brackets 24, from the ceiling or suitable timbers 25. This contact causes the two members of coupling A to separate, see dotted lines in Fig. 1, the lifter-chain with its hook 15, passing on, while hook 14, which is held back by rails 23 cannot follow, and with the shackled hog is left hanging behind on rail 23. It slides outwardly now on this latter, that is away from the apparatus as shown in Fig. 7, which is the position in which the hog arrives in front of the so-called sticker who now sticks the same, after which it passes on to be dumped into the scalding vat, this further passage on rail 23, to the vat giving it a chance to bleed.

The complementary members of coupling A, are so arranged that a prompt disengagement takes place when the straight part of member 14, comes in contact with rail 23. This disengagement is also positive since rail 23, being angularly arranged to the path of the moving parts, prevents member 14 of the coupling from passing. For such purpose members 14 and 15, are flat see Figs. 4, 5, and 6, so that, particularly where they come together as shown in Fig. 4, sufficient surface-contact takes place to prevent one member from twisting on, or working loose from the other one. Chain 13, connects to hook 14, with a swivel-joint 26, so that it may freely turn in case the hog struggles, without becoming twisted or affecting the members of the coupling while engaged. When so engaged, point a, of hook 15, occupies a perforation b, in lug c, which extends upwardly from the outer free end of hook 14, as best shown in Figs. 4 and 6. When the straight part of hook 14, is held back by sticking-rail 23 which extends transversely across its path, this point a, slips readily out of lug c, and releases hook 14, which remains behind and drops now onto rail 23, as shown in dotted lines in Fig. 1, see also Fig. 6.

A ratchet-wheel 27, is provided on the rear-end of shaft 28, of the lower wheel 18, which in conjunction with a pawl 29, holds the moving parts to their position in case any thing gives way during operation. To counteract any effect of the struggling animal upon the hoisting-chain, we steady the ascending branch of this chain by guide rollers 31, there being two, on the inner side of this chain, and one between them on the opposite side, all as best shown in Figs. 1, and 2. These rollers are mounted on one of the upright timbers 32, of the general frame. The space between these parts of the frame on the front-side of the same and back of the lifter-chain, is best closed or boarded up as shown, likewise the front side of wheel 18, the arms of which are covered, to prevent any possible entanglement of the chains or other moving parts.

For the purpose of keeping hoisting chain 17, stretched tight, one of the wheels, the lower one in this case, is supported adjustably, so that it may be moved away from the other wheel. For such purpose box 33, in which shaft 28, of the lower wheel is supported, rests on a movable-frame part 34, held in place at its ends by guides 35, secured to the inside of each frame-upright 32. Screw 36, seated in lugs 37, also projecting from parts 32, serve to accomplish this adjustment as best shown in Fig. 2. To prevent the lower wheel from wabbling, we provide on its rear and upper sides a guide-roller 38, supported on a frame-part 39, which is connected between the upright frame timbers 32, as shown in Fig. 2.

An important feature of our apparatus is the connection to and support on the main-frame of the hoist, of the starting-end of sticking-rail 23, which end for such purpose we connect to a cross-timber 41, forming a part of such main-frame. This connection is made by means of a box 42, as shown in Figs. 2, 7, and 8. This construction which places the end of the sticking-rail at an angle to the plane in which the chain moves, adds greatly to the rigidity of the structure, it permits proper adjustment and always maintains the parts of the apparatus in their proper compact relations, which prevents hogs from missing the rail. It also aids in quick and convenient erection of the apparatus and the angular arrangement of the sticking-rail insures a prompt operation since the released hog quickly clears the chains. The movement on rail 23 is smooth since the flat part of hook 14 in contact with such rail prevents wabbling. The substantially triangular arrangement of the frame which places all weights, permanent, as well as those of the animals hoisted, within the base-line of the structure, increases the stability of the same. The arrangement of wheels 18 and 19, one centrally below the other, permits travel of chain 17 in either direction and obviates the special arrangement of machines for travel in either right or left direction otherwise required.

The sticking-rail is slightly inclined at its starting end so that the suspended hog slides at once freely away from the hoisting-chain as soon as disengaged from the particular lifter-chain. (See Fig. 7.) A more decided start may be given by shaping the starting portion of rail 23, as shown in Fig. 8, where the end starts with a more abrupt incline. The starting portion may also be formed in shape of a bracket 43, which is attached to timber 41, in place of box 42, and to the outer end of which the end of rail 23, connects. This feature of our invention is also applicable to such forms of hog-hoists in which a carrier-wheel 44, takes the place of hoisting-chain 17, and to which wheel lifter-chain 16, connect. Such a wheel is shown in Figs. 10, and 11, the latter at reduced scale. The end of rail 23, might be supported on the outer end of wheel-shaft 28, as shown in Fig. 10 the connection being such that it does not interfere with rotation of this shaft. This form of connection would require however longer lifter-chains. To obviate this and to bring the rail higher up and to the same position as shown in the other forms of the apparatus, an intermediate support 45, may be interposed as shown in Fig. 11, which support rests on the end of shaft 28, without actual connection, and supports the end of rail 23.

Having described our invention, we claim as new:

1. In a hog-hoisting apparatus, the combination of an upright frame, two sprocket-wheels supported thereon, an endless hoisting-chain carried on the wheels, mechanism to rotate one of them to move the chain, means to detachably connect hogs to this chain and a sticking-rail which receives these hogs after being elevated by the hoisting-chain, the end of this rail being attached to the frame between the ascending and descending branches of the chain and arranged so as to project from the point of its attachment at an angle to the plane in which the chain travels.

2. In a hog-hoisting apparatus, the combination of an upright frame, two sprocket-wheels supported thereon, an endless hoisting-chain carried on these wheels, mechanism to rotate one of them to move the chain, lifter-chains carried by this hoisting-chain and depending therefrom, shackle-chains, a coupling consisting of two complementary members whereby the shackle-chains are detachably connected to the free ends of the lifter chains, and a sticking-rail supported at an angle to the plane in which the hoisting-chain travels and located so as to extend across the path of the shackling-chains and the coupling-member thereon to which it is also arranged at an angle so as to cause this member when traveling with the hoisting-chain to strike sidewise against the sticking-rail, whereby it is positively prevented from traveling further with the lifter-chain, and disengaged therefrom after which it drops onto the sticking-rail which it engages with its hook.

3. In a hog-hoisting apparatus, the combination of a sticking-rail, a hoisting-chain, lifter-chains carried thereby, shackling-chains carried thereby, shackling-chains and a coupling consisting of two complementary members, one on one end of each of the chains and each provided with a hook, the members on the shackling-chains having also a horizontally extending perforation adapted to be occupied by the hook of the members on the lifter-chains when the two coupling-members are engaged, the hook of the members on the shackling-chains being adapted to engage the sticking-rail and both members containing complementary parts with a flat surface, the horizontally directed perforation mentioned being contained in one of these parts, while the hook adapted to occupy said perforations project laterally from the flat part of the other member so that, when both members of the coupling are engaged, these flat surfaces are in contact and prevent the said members from twisting on each other.

In testimony whereof we hereunto set our hands in presence of two witnesses.

GUSTAV SCHMIDT.
JOSEPH F. PFLUM.

Witnesses:
C. SPENGEL,
T. LE BEAU.